(12) United States Patent
Dufour et al.

(10) Patent No.: US 7,568,312 B2
(45) Date of Patent: *Aug. 4, 2009

(54) CAM AND LINK MECHANISM FOR A FLUSH SLIDING WINDOW

(75) Inventors: William T. Dufour, Macomb, MI (US); Ricky Lawrence Stone, St. Joseph, TN (US); Jason Oneal Belew, Loretto, TN (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 98 days.

This patent is subject to a terminal disclaimer.

(21) Appl. No.: 11/119,988

(22) Filed: May 2, 2005

(65) Prior Publication Data

US 2006/0260205 A1 Nov. 23, 2006

(51) Int. Cl.
*E05D 15/10* (2006.01)
(52) U.S. Cl. .............................. 49/413; 49/380; 49/216
(58) Field of Classification Search .................. 49/413, 49/380, 220, 221, 225, 128, 130, 216, 209, 49/213, 116, 125, 127, 260
See application file for complete search history.

(56) References Cited

U.S. PATENT DOCUMENTS

| | | | | |
|---|---|---|---|---|
| 3,750,335 | A | * | 8/1973 | Marsh .......................... 49/220 |
| 4,124,054 | A | | 11/1978 | Spretnjak |
| 4,317,312 | A | * | 3/1982 | Heideman .................... 49/220 |
| 4,384,429 | A | * | 5/1983 | Rokicki et al. ................ 49/130 |
| 5,442,880 | A | | 8/1995 | Gipson |
| 5,522,191 | A | | 6/1996 | Wenner et al. |
| 5,542,214 | A | * | 8/1996 | Buening ....................... 49/380 |
| 5,613,323 | A | | 3/1997 | Buening |
| 5,724,771 | A | | 3/1998 | Gipson |
| 5,775,029 | A | | 7/1998 | Buening |
| 5,787,643 | A | | 8/1998 | Schmuck |
| 5,799,449 | A | | 9/1998 | Lyons |
| 5,822,922 | A | | 10/1998 | Grumm |
| 5,836,110 | A | | 11/1998 | Buening |
| 5,941,022 | A | | 8/1999 | Schmuck |
| 5,996,284 | A | * | 12/1999 | Freimark et al. .............. 49/209 |
| 6,014,840 | A | | 1/2000 | Ray |
| 6,026,611 | A | | 2/2000 | Ralston |
| 6,223,470 | B1 | | 5/2001 | Millard |
| 6,766,617 | B2 | | 7/2004 | Purcell |

(Continued)

*Primary Examiner*—Gregory J. Strimbu
(74) *Attorney, Agent, or Firm*—Porter, Wright, Morris & Arthur LLP; Richard M. Mescher; Dean B. Watson

(57) ABSTRACT

A window assembly of a motor vehicle includes a pair of spaced-apart fixed window panes forming an opening therebetween, vertically spaced-apart upper and lower tracks, a sliding window pane having opposed upper and lower edges that move along the upper and lower tracks, and a camming mechanism including a plurality of cams. The cams are pivotably secured to the sliding window pane near corners of the sliding window pane. An actuator is operatively connected to the cams for selectively and simultaneously pivoting the cams. Simultaneously pivoting the cams forcibly moves the sliding window pane between a closed position wherein an outside surface of the sliding window pane is in a first plane substantially flush with an outer surface of the fixed window panes and an open position wherein the outside surface of the sliding window pane is in a second plane substantially parallel to and offset from the first plane.

15 Claims, 5 Drawing Sheets

U.S. PATENT DOCUMENTS

| | | |
|---|---|---|
| 7,437,852 B2 | 10/2008 | Dufour |
| 2002/0148163 A1* | 10/2002 | Warner et al. ................ 49/209 |
| 2005/0044799 A1* | 3/2005 | Kinross et al. ................ 49/413 |
| 2006/0174544 A1* | 8/2006 | Dufour et al. ................ 49/413 |

* cited by examiner

CAM AND LINK MECHANISM FOR A FLUSH SLIDING WINDOW

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to a window assembly for a motor vehicle and, more particularly, to a motor vehicle window assembly having a sliding window pane movable between a closed position wherein the sliding window pane is substantially flush with adjacent fixed window panes and/or body panels and an open position in which the sliding window pane is parallel and offset from the adjacent fixed window panes for lateral sliding movement relative to the fixed window panes.

BACKGROUND OF THE INVENTION

Motor vehicle window assemblies often have one or more sliders or sliding window panes, that is, window panes which slide either substantially horizontally or vertically with respect to the remainder of the window assembly. These sliding window panes can be either manually operated using a handle or power operated using an electric motor. Such window assemblies are used, for example, as rear windows for pick-up trucks and the like. Typically, one or more sliding window panes are mounted between fixed window panes in a frame. The frame typically integrates the sliding window panes and the fixed window panes as a self-contained pre-assembled module suitable for shipping and handling during installation into a motor vehicle.

As the desire for exterior surfaces of motor vehicles, including pickup trucks and the like, to be smoother and more aerodynamic has grown, a need has developed for window assemblies to present a more flush appearance. Typical rear window assemblies for pick-up trucks and the like have a central sliding window pane which is not flush with side fixed window panes. Rather, the sliding window pane is recessed from the fixed window panes in a direction toward the passenger compartment so that it can slide laterally inside one or both of the fixed window panes. Therefore, the window assembly does not contribute to a desired smooth exterior surface.

In order to contribute to a smooth exterior surface, window assemblies were developed having flush mounted sliding window panes. For example, see U.S. Pat. No. 4,850,139, the disclosure of which is expressly incorporated herein in its entirety by reference, which discloses a flush glass sliding window. The sliding pane is located in a slot having a wider portion so that the one side of the sliding pane can be manually pulled out of its flush closed position and thin slid inside the adjacent fixed pane. However, the window pane is free to shift and rattle in the wider slot when left in a closed unlocked condition. It is undesirable to have sliding window panes which are free to shift and rattle in such fashion.

In order to eliminate such rattling, window assemblies were developed having flush mounted sliding window panes that are constrained at all times. For example, see U.S. Pat. No. 5,542,214, the disclosure of which is expressly incorporated herein in its entirety by reference, which discloses a flush-closing multi-pane window assembly. The window assembly includes kick out means mounted on the frame which engage pins fixed to the sliding pane to force the sliding pane from its flush closed position to an offset parallel plane during initial lateral movement. However, the number of components and the relative mechanical complexity of this assembly makes it relatively expensive to produce. There is a never ending desire in the motor vehicle industry to reduce cost and weight.

U.S. Pat. Nos. 5,799,444 and 5,996,284, the disclosures of which are expressly incorporated herein in their entireties by reference, disclose a window assembly having a flush sliding pane. A pivoting handle is secured to the sliding window which slides along a channel. The handle has a cam projection in the channel so that the sliding window moves generally perpendicular to the window opening when the handle is rotated in one end of the channel. However, these window assemblies do not provide desired sealing performance. Accordingly, there is a need in the art for an improved window assembly having a flush sliding window pane.

SUMMARY OF THE INVENTION

The present invention provides a window assembly for a motor vehicle which overcomes at least some of the above-noted problems of the related art. According to the present invention, a sliding window assembly comprises, in combination, vertically spaced-apart upper and lower tracks, a sliding window pane having opposed upper and lower edges configured to move along the upper and lower tracks, and a camming mechanism including a plurality of cams. A first one of the cams is pivotably secured to the sliding window pane near a first end of the upper edge and engaging the upper track. A second one of the cams is pivotably secured to the sliding window pane near a first end of the lower edge and engaging the lower track. A third one of the cams is pivotably secured to the sliding window pane near a second end of the upper edge and engaging the upper track. A fourth one of the cams is pivotably secured to the sliding window pane near a second end of the lower edge and engaging the lower track. An actuator is operatively connected to the cams for selectively pivoting the cams. Pivoting the cams forcibly moves the sliding window pane relative to the upper and lower tracks between a closed position wherein an outside surface of the sliding window pane is in a first plane substantially flush with the panels so that the sliding window pane closes the opening and an open position wherein the outside surface of the sliding window pane is in a second plane substantially parallel to and offset from the first plane so that the sliding window pane can selectively move along the tracks.

According to another aspect of the present invention, a window assembly of a motor vehicle comprises, in combination, a pair of spaced-apart fixed window panes forming an opening therebetween, vertically spaced-apart upper and lower tracks, a sliding window pane having opposed upper and lower edges configured to move along the upper and lower tracks, and a camming mechanism including a plurality of cams. A first one of the cams is pivotably secured to the sliding window pane near a first end of the upper edge and engaging the upper track. A second one of the cams is pivotably secured to the sliding window pane near a first end of the lower edge and engaging the lower track. A third one of the cams is pivotably secured to the sliding window pane near a second end of the upper edge and engaging the upper track. A fourth one of the cams is pivotably secured to the sliding window pane near a second end of the lower edge and engaging the lower track. An actuator is operatively connected to the cams for selectively pivoting the cams. Pivoting the cams forcibly moves the sliding window pane relative to the upper and lower tracks between a closed position wherein an outside surface of the sliding window pane is in a first plane substantially flush with an outer surface of the fixed window panes so that the sliding window pane closes the opening and an open position wherein the outside surface of the sliding window pane is in a second plane substantially parallel to and offset from the first plane so that the sliding window pane can selectively move along the tracks.

According to another aspect of the present invention, a window assembly of a motor vehicle comprises, in combination, a pair of spaced-apart fixed window panes forming an opening therebetween, vertically spaced-apart upper and lower tracks, a sliding window pane having opposed upper and lower edges configured to move along the upper and lower tracks, and a camming mechanism including a plurality of cams. A first one of the cams is pivotably secured to the sliding window pane near a first end of the upper edge and engaging the upper track, a second one of the cams is pivotably secured to the sliding window pane near a first end of the lower edge and engaging the lower track. A third one of the cams is pivotably secured to the sliding window pane near a second end of the upper edge and engaging the upper track. A fourth one of the cams is pivotably secured to the sliding window pane near a second end of the lower edge and engaging the lower track. A first connecting member is pivotably connected to the sliding window pane and extends between the first and second cams for simultaneously pivoting the first and second cams upon selective pivoting of the first connecting member. A second connecting member is pivotably connected to the sliding window pane and extends between the third and fourth cams for simultaneously pivoting the first and second cams upon selective pivoting of the second connecting member. A link member operably connects the first connecting member and the second connecting member to transfer pivoting motion therebetween. An actuator is operatively connected to the first connecting member for simultaneously pivoting the cams. Pivoting the cams forcibly moves the sliding window pane relative to the upper and lower tracks between a closed position wherein an outside surface of the sliding window pane is in a first plane substantially flush with an outer surface of the fixed window panes so that the sliding window pane closes the opening and an open position wherein the outside surface of the sliding window pane is in a second plane substantially parallel to and offset from the first plane so that the sliding window pane can selectively move along the tracks.

From the foregoing disclosure and the following more detailed description of various preferred embodiments it will be apparent to those skilled in the art that the present invention provides a significant advance in the technology and art of window assemblies for motor vehicles. Particularly significant in this regard is the potential the invention affords for providing a high quality, reliable, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 1:
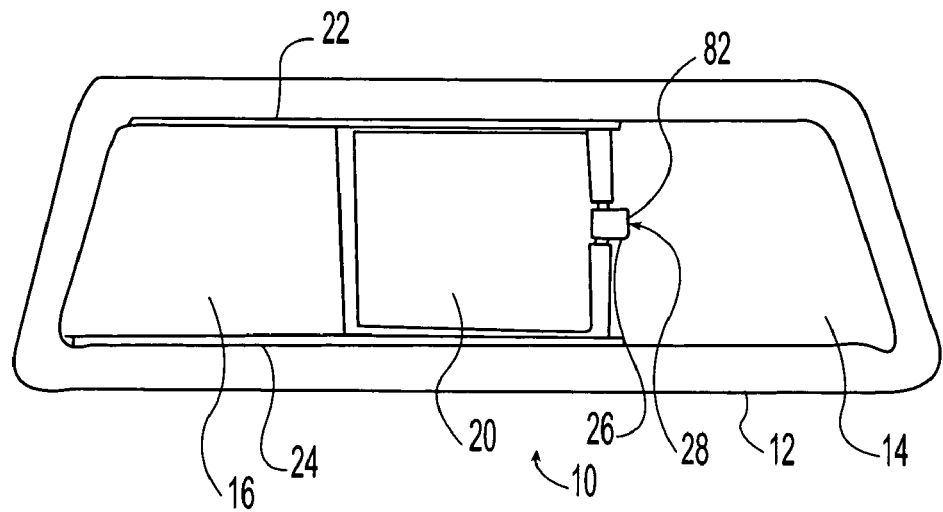
FIG. 1 is a schematic view of a window assembly according to a preferred embodiment of the present invention.
Figure 6:
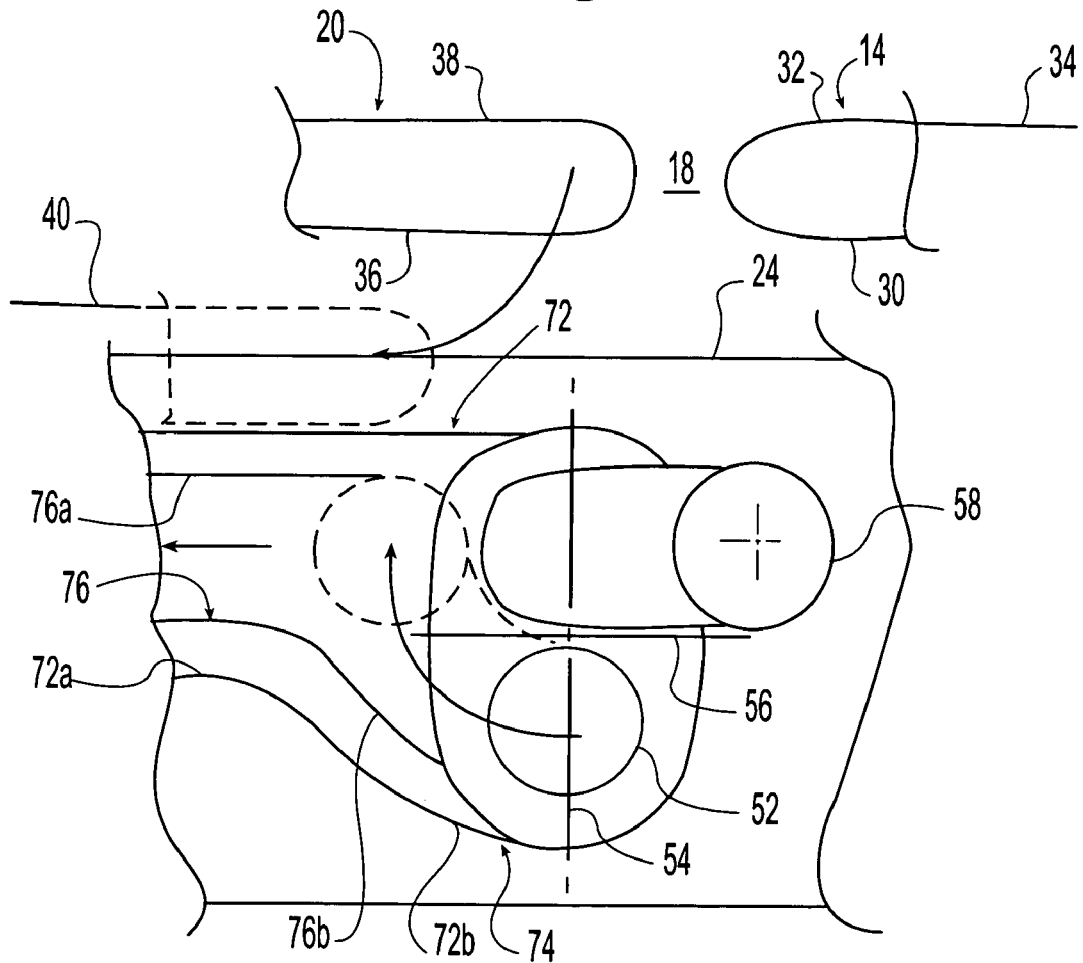
FIG. 6 is a schematic view showing movement of the sliding window pane of FIGS. 1 to 5 between a closed position where the sliding window pane is substantially flush with an adjacent fixed window pane and an open position where the sliding window pane is parallel and offset from the adjacent window pane for lateral sliding movement relative to the fixed window pane.

It should be understood that the appended drawings are not necessarily to scale, presenting a somewhat simplified representation of various preferred features illustrative of the basic principles of the invention. The specific design features of a window system for a motor vehicle as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the window assembly illustrated in the drawings. In general, up or upward refers to an upward direction within the plane of the paper in FIG. 1 and down or downward refers to a downward direction within the plane of the paper in FIG. 1. Also in general, fore or forward refers to a direction toward the front of the motor vehicle, that is, out of the plane of the paper in FIG. 1 and aft or rearward refers to a direction toward the rear of the motor vehicle, that is, into the plane of the paper in FIG. 1.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved sliding window assembly disclosed herein. The following detailed discussion of various alternative and preferred embodiments will illustrate the general principles of the invention with reference to a sliding window assembly for use as a rear window for a pickup truck or the like. Other embodiments suitable for other applications, such as, for example vans, sport utility vehicles, cross over vehicles, or other motor vehicles will be apparent to those skilled in the art given the benefit of this disclosure.

Referring now to the drawings, FIG. 1 schematically shows a window assembly 10 according to a preferred embodiment of the present invention viewed from a forward or inboard side. The illustrated window assembly 10 includes a circumferential frame 12, a pair of laterally spaced-apart fixed panes or panels 14,16 forming an opening 18 therebetween, a sliding pane or panel 20 selectively movable to open and close the opening 18, vertically spaced-apart upper and lower tracks 22, 24 for movement of the sliding pane 20, a camming mechanism 26 that forcibly moves the sliding pane 20 between a closed position and an open position as described in more detail hereinafter, and an actuator 28 operatively connected to the camming mechanism 26 for selectively actuating movement of the sliding pane 20.

The illustrated fixed panes 14, 16 are each substantially planar having inner and outer surfaces 30, 32. The illustrated fixed panes 14, 16 are rectangular shaped but any other suitable shape can alternatively be utilized. The illustrated fixed panes 14, 16 are held within the frame 12 at fixed positions relative to the frame 12 and the motor vehicle in which the frame 12 is installed. The fixed panes 14, 16 are positioned to be parallel and in the same plane such that the outer surfaces 32 of the fixed panes 14, 16 form a first plane. The illustrated fixed panes 14, 16 comprise glass and are substantially transparent to form windows but alternatively can be any other suitable material and can alternatively be opaque or partially opaque.

Figure 2:
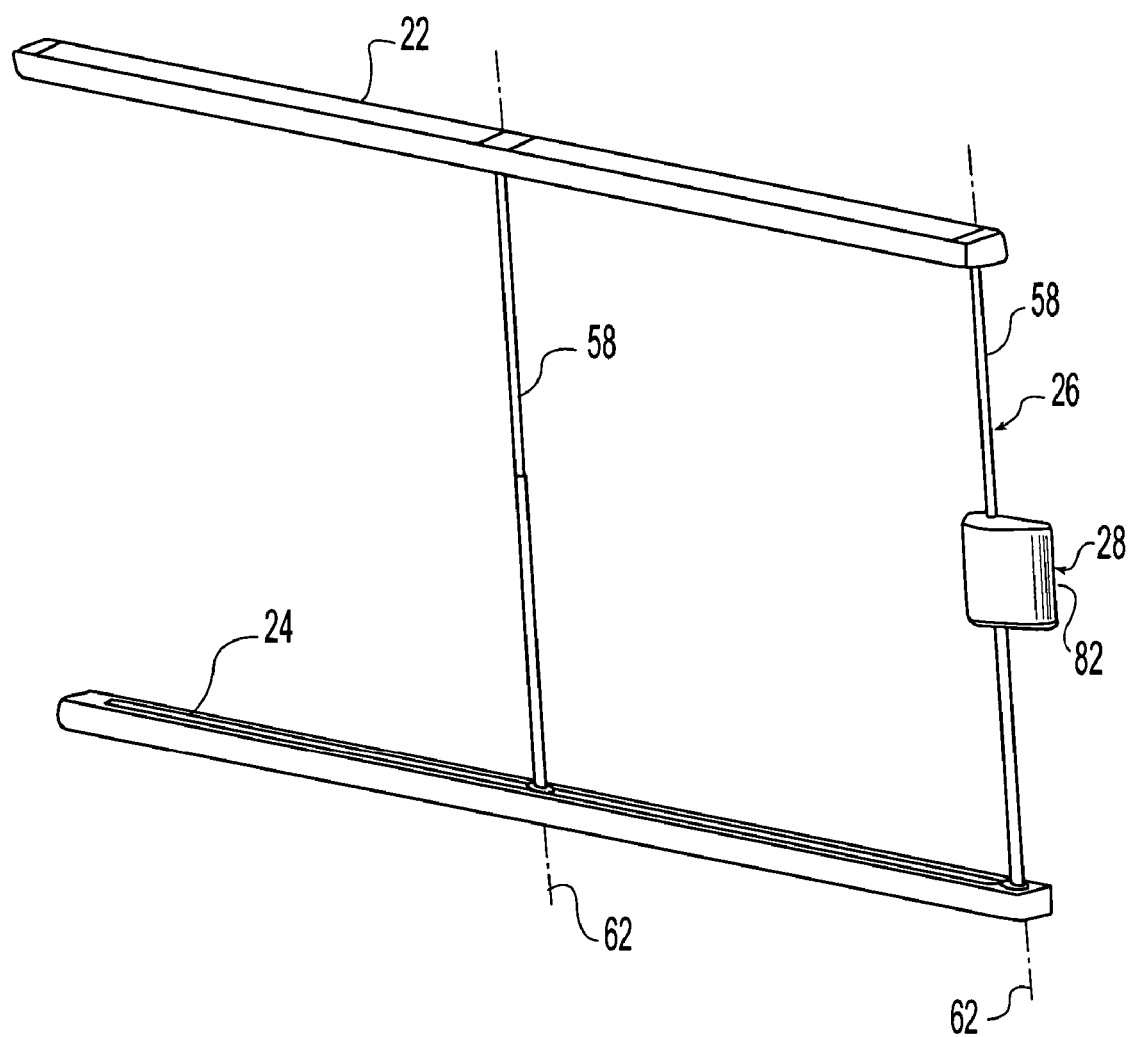
FIG. 2 is a perspective view of a sliding window assembly of FIG. 1, wherein a sliding window pane is removed for clarity.

As best shown in FIG. 2, the upper and lower tacks 22, 24 extend in a lateral direction and are vertically spaced apart to receive the sliding pane 20 therebetween and guide movement of the sliding pane 20 as described in more detail hereinafter. The illustrated upper and lower tracks 22, 24 are mirror images of one another but can alternatively be formed in any other suitable manner.

Figure 3:
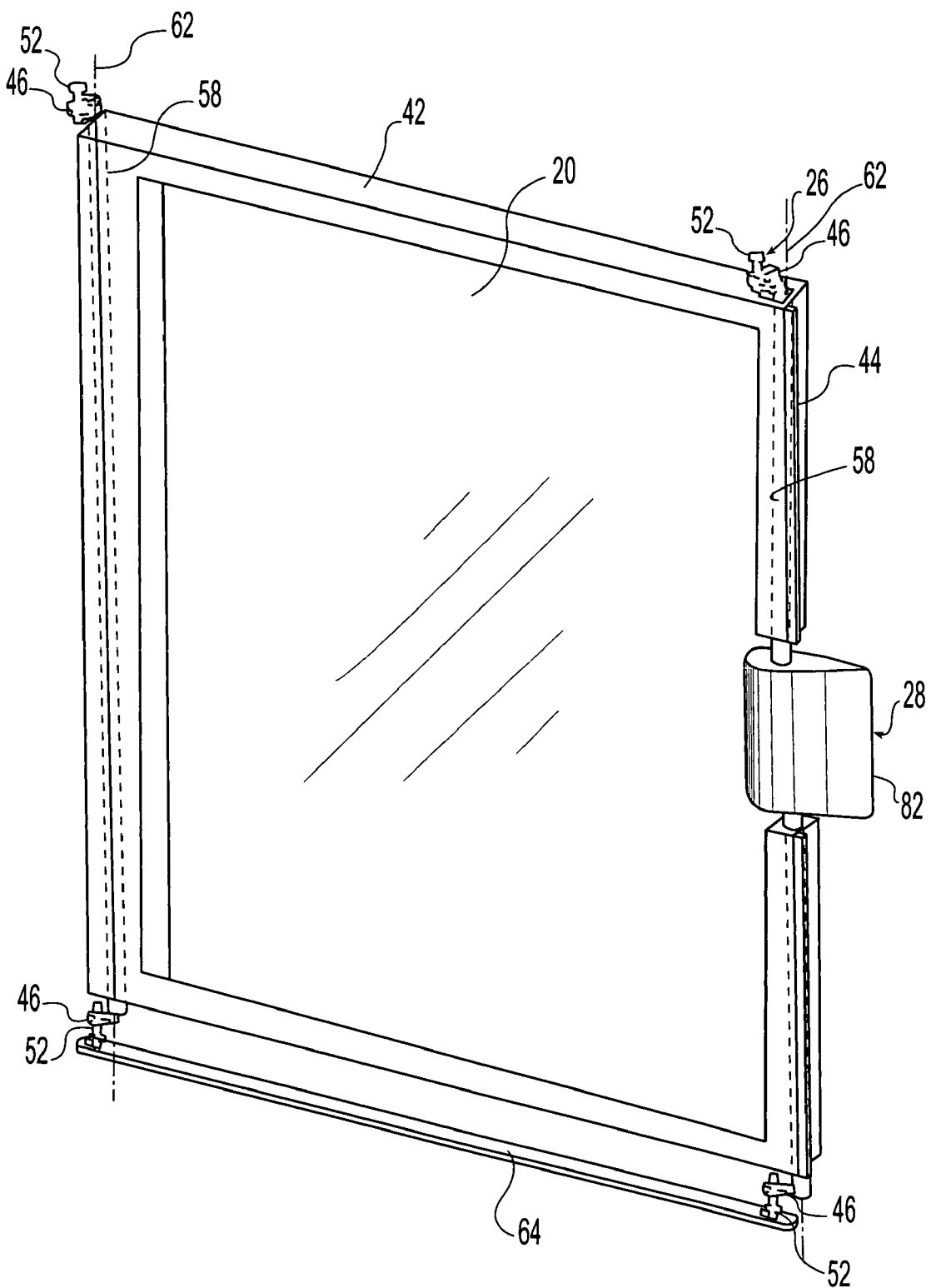
FIG. 3 is a perspective view of the sliding window assembly of FIGS. 1 and 2, wherein upper and lower tracks are removed for clarity.
Figure 4:
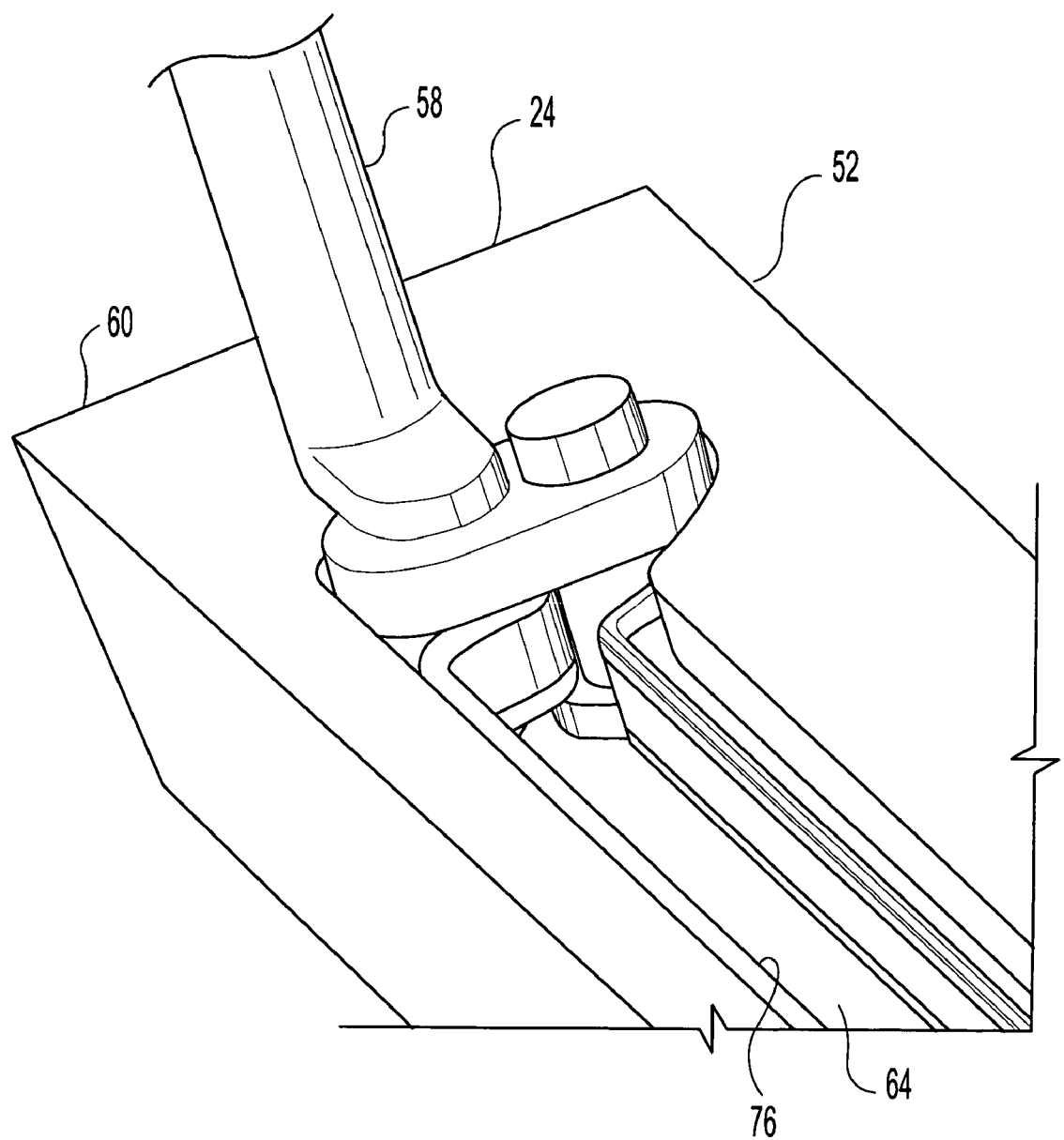
FIG. 4 is an enlarged, fragmented perspective showing a cam and a guide pin within the lower track of the sliding window assembly of FIGS. 1 to 3.
Figure 5:
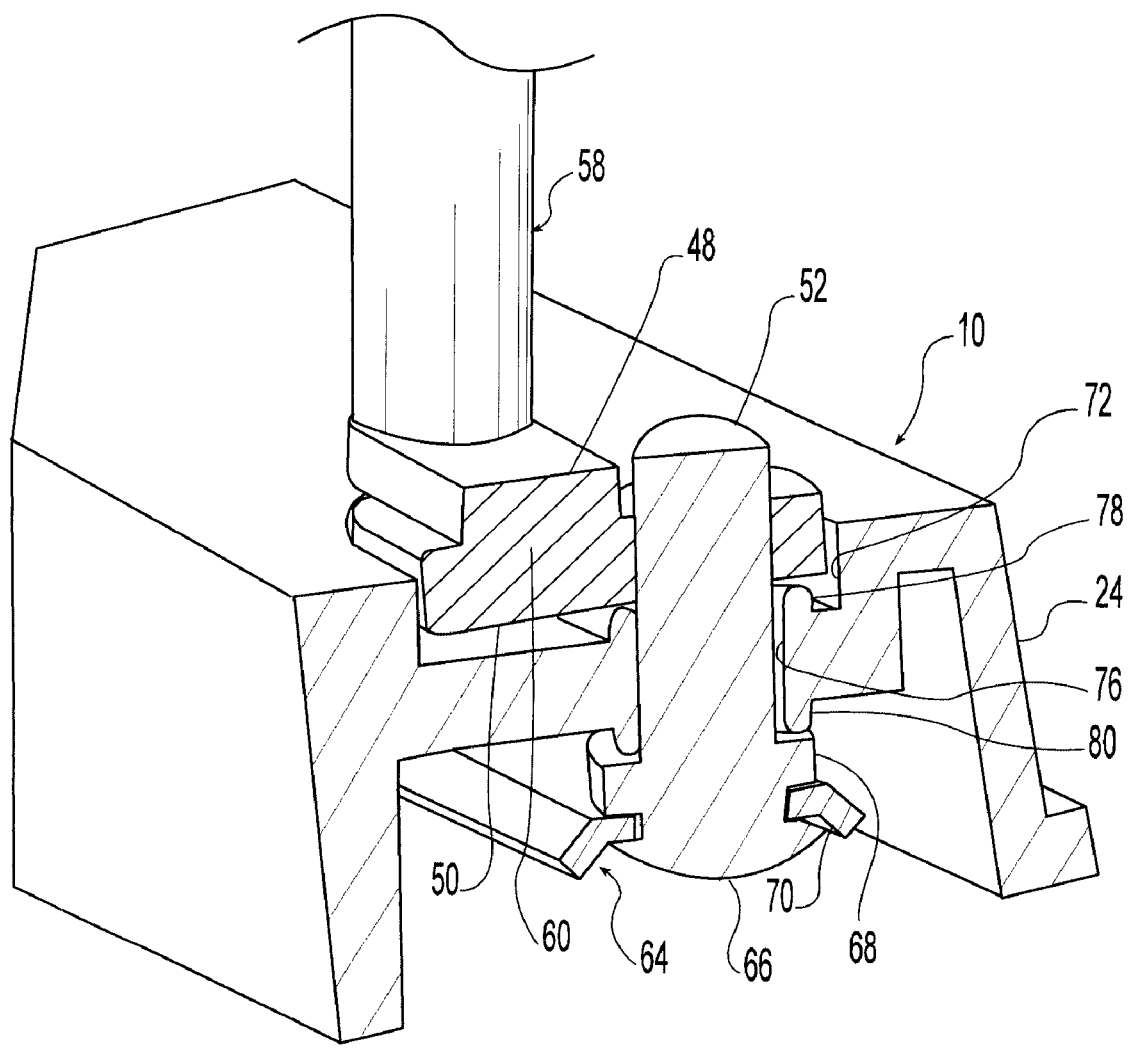
FIG. 5 is a cross-sectional view showing the cam and the guide pin within the lower track of the sliding window assembly of FIGS. 1 to 4.

As best shown FIG. 3, the sliding pane 20 is substantially planar having inner and outer surfaces 36, 38. The illustrated sliding pane 20 is rectangular-shaped but any other suitable shape can alternatively be utilized. The illustrated sliding pane 20 is held between the tracks 22, 24 and moveable between a closed position wherein the outer surface 38 of the sliding pane 20 is positioned to be parallel and in the first plane 34 with the outer surfaces 32 of the fixed panes 14, 16 to close the opening 18 with a flush appearance and an open position wherein the outer surface 38 of the sliding pane 20 is in a second plane 40 substantially parallel to and offset from the first plane 34 so that the sliding pane 20 can selectively move along the tracks 22, 24 adjacent one of the fixed panes 16 to open the opening 18. The illustrated sliding pane 20 comprises glass and is substantially transparent to form a window but alternatively can be any other suitable material and can alternatively be opaque or partially opaque. The illustrated sliding pane 20 is provided with a frame 42 extending about its perimeter. The frame 42 is provided with a sealing member 44 to engage the fixed panes 14, 16 and seal the opening 18 when the sliding pane 20 is in the closed position. It is noted, however, that the sliding pane 20 can alternatively have a frameless configuration.

As best shown in FIGS. 2 to 6, the illustrated camming mechanism 26 includes a plurality of cams 46 forcibly move the sliding pane 20 relative to the upper and lower tracks 22, 24 between the closed position wherein the outer surface 38 of the sliding pane 20 is in the first plane 34 substantially flush with the fixed panels 14, 16 so that the sliding pane 20 closes the opening 18 and the open position wherein the outer surface 38 of the sliding pane 20 is in the second plane 40 substantially parallel to and offset from the first plane 34 so that the sliding pane 20 can selectively move along the tracks 22, 24 to open the opening 18. The illustrated camming mechanism 26 has four cams 46 corresponding with the four corners of the rectangular-shaped sliding pane 20 wherein a first one of the cams 46 is pivotably secured to the sliding pane 20 near a first end of the upper edge and engaging the upper track 22, a second one of the cams 46 is pivotably secured to the sliding pane 20 near a first end of the lower edge and engaging the lower track 24, a third one of the cams 46 is pivotably secured to the sliding pane 20 near a second end of the upper edge and engaging the upper track 22, and a fourth one of the cams 46 is pivotably secured to the sliding pane 20 near a second end of the lower edge and engaging the lower track 24. It is noted that other suitable quantities of cams 46 can alternatively be utilized. The cams 46 are sized and shaped to cooperate with the tracks 22, 24 as described in more detail hereinafter. The illustrated cams 46 are generally oval shaped having substantially planar upper and lower surfaces 48, 50 but it is noted that the cams 46 can alternatively have any other suitable shape.

The illustrated camming mechanism 26 also includes a plurality drive or guide pins 52 that are rigidly secured to the cams 46. Each of the cams 46 has an associated one of the guide pins 52 secured thereto. The illustrated guide pins 52 extend outwardly from the cams 46 toward the tracks 22, 24, that is, the guide pins 52 secured to the cams 46 along the upper edge of the sliding pane 20 extend in an upward direction from the cams 46 and the guide pins 52 secured to the cams 46 along the lower edge of the sliding pane 20 extend in a downward direction from the cams 46. The guide pins 52 are rigidly secured to the cams 46 to substantially prevent relative movement therebetween so that the guide pins 52 move with the cams 52 and vice versa. Each of the illustrated guide pins 52 each extend from the cam 46 along a longitudinally extending centerline 54 of the cam 46 and offset from a laterally extending centerline 56 of the cam 46 toward an end of the cam 46. The guide pins 52 interact with the tracks 22, 24 as described in more detail hereinafter.

The illustrated camming mechanism 26 also includes a pair of connecting members or rods 58. One of the illustrated connecting members 58 vertically extends between the first and second cams 46 located near the first end of the sliding pane 20 and the other illustrated connecting member 58 vertically extends between the third and fourth cams 46 located near the second end of the sliding pane 20. The illustrated connecting members 58 extend inwardly from the cams 46 in a direction away from the tracks 22, 24, that is, the connecting members 58 extend downwardly from the cams 46 along the upper edge of the sliding pane 20 and extend upwardly from the cams 46 along the lower edge of the sliding pane 20. The connecting members 58 are rigidly secured to the cams 46 to substantially prevent relative movement therebetween so that the connecting members 58 move with the cams 46 and vice versa. The illustrated connecting members 58 each extend from the cam 46 laterally offset from the longitudinally extending centerline 54 of the cam 46 and longitudinally offset from the laterally extending centerline 56 of the cam 46 toward the end of the cam 46 opposite the guide pin 52. The illustrated cams 46 are provided with integral flanges 60 for positioning the connecting members 58 in this manner. It is noted that the illustrated connecting members 58 and cams 46 are molded as integral one-piece components but can alternatively can be formed as separate components rigidly secured together. The illustrated connecting members 58 are pivotably secured to the sliding pane so that the connecting members are pivotable relative to the sliding pane 20 about vertical pivot axes 62 formed by the longitudinal axes of the connecting members 58. The illustrated connecting members 58 extend through openings in the frame 42 at the ends of the sliding pane 20.

The illustrated camming mechanism 26 also includes a connecting link or arm 64 that laterally extends between the guide pins 52 at the lower track 24 so that the cams 46, the guide pins 52, and the connector member 58 of at the second end of the sliding member 20 moves with the cams 46, the guide pins 52, and the connector member 58 of at the first end of the sliding member 20 so that all of the cams 46 pivot at substantially the same time upon actuation of the single actuator 28. The illustrated link 64 is provided with a pair of openings that receive the lower guide pins 52. The illustrated guide pins 52 are provided with a head 66 and a flange 68 which form a groove 70 therebetween for receiving the link 64. Secured in this manner, the link 64 is pivotable relative to the guide pin 52 about the longitudinal axis of the guide pin 52 but is otherwise secured to the guide pin 52 to substantially prevent relative movement in all directions. It is noted that a second link located at the guide pins 52 at the upper end of the sliding pane 20 can alternatively be provided if desired or the link 64 can be formed in any other suitable manner. It is also noted that the link 64 can be eliminated when more than one actuator 28 is utilized or the actuator 28 is connected to more than one location.

Each track 22, 24 is provided with an inwardly-facing groove 72 that extends substantially along the length of the track 22, 24. The groove 72 has a main portion 72a sized and shaped for closely receiving the width of the cams 46 therein as the sliding panel 20 is in the open position and moves along the tracks 22, 24 and a pair of camming portions 72b sized and shaped to closely receive the length of the cams 46 therein when the sliding panel 20 is in the closed position. The camming portions 72b form a camming surface 74 engaged by the peripheral side of the cams 46 whereby the cams 46 pivot approximately ninety degrees to move the sliding pane 20 between the closed position and the open position. A slot 76 is provided along the groove 72 that is sized and shaped to closely receive the guide pins 52. The slot 76 has a substantially straight main portion 76a sized and shaped for closely receiving the guide pins 52 therein as the sliding panel 20 is in the open position and moves along the tracks 22, 24 and a pair of arcuate portions 76b sized and shaped to closely receive the guide pins 52 as the sliding panel 20 is moved between the open position and the closed position. The illustrated slot 76 is provided with ride beads 78 extending along inner edges of the slot 76 to engage the planar surface 50 of the cams 46 so that the cams 46 ride long the ride beads 78 as the guide pins 52 move along the slot 76. The illustrated slot 76 is also provided with ride beads 80 extending along outer edges of the slot 76 to engage the flanges 68 of the guide pins 52 so that the guide pins 52 ride long the ride beads 80 as the guide pins 52 move along the slot 76. Engaged in this manner, the sliding panel 20 is closely held to the tracks 22,24 at all times to prevent undesired rattling and vibrations.

The illustrated actuator 28 includes a handle 82 directly secured to the center of the first connecting member 58. The illustrated handle 82 is sized and shaped so that ninety degree-movement from a first position (shown in FIGS. 1 to 3) to a second position rotates the cams 46 ninety-degrees to move the sliding pane 20 from the closed position to the open position. It is noted that any other suitable handle 82 can alternatively be utilized or alternatively more than one handle 82 can be utilized. It is also noted that while a manual form of the actuator 28 is illustrated, a powered form of the actuator 28 can alternatively be utilized.

When the user desires to open the sliding pane 20 so that the opening 18 is open, the user grasps the handle 82 and pulls so that the handle 82 pivots about ninety-degrees toward the user. The handle 82 pivots the first connecting member 58, that is rigidly connected thereto, about ninety-degrees. The connecting member 58 pivots the cams 46 and the guide pins 52, that are rigidly connected thereto, about ninety-degrees. Due to the link 64, the movement of the lower guide pin 52 simultaneously moves the guide pins 52, the cams 46, and the connecting member 58 at the second end of the sliding pane 20. As the cams 46 simultaneously move, the cams 46 follow the camming surface 74 of the groove 72 and move the sliding pane 20 inward toward the interior of the motor vehicle so that the outer surface of the sliding pane 20 moves from the first plane 34 to the second plane 40. This movement of the sliding pane 20 is near ninety-degree movement, that is, the movement is nearly perpendicular to the fixed panes 14, 16. As the cams 46 move, the guide pins 52 move from the slot arcuate portion 76b to the slot main portion 76a (best shown in FIG. 6). Positioned in this manner, the user can slide the sliding pane 20 along the tracks 22, 24 adjacent the second fixed pane 16 to open the opening 18 between the fixed panes 14, 16.

It is apparent from the above detailed description, that the window assembly 10 according to the present invention not only remains retrained at all times to prevent rattling but also has positive locks spaced around the periphery of the sliding window to ensure positive engagement with the sealing member 44 in the closed position to obtain desired sealing performance to keep out the environment and is also relative inexpensive to manufacture. It should also be apparent that the near ninety-degree inboard motion of the sliding pane 20 enables the margins or gaps between the sliding pane 20 and the fixed panes 14, 16 to be minimized to further obtain desired sealing performance by having less space for wind and water to infiltrate.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A sliding window assembly for selectively closing an opening formed between a pair of spaced-apart panels of a motor vehicle, said sliding window assembly comprising, in combination:

vertically spaced-apart first and second tracks;

a sliding window pane having opposed first and second horizontally extending edges configured to move along the first and second tracks;

a camming mechanism including a plurality of cams;

wherein a first one of the plurality of cams is pivotably secured to the sliding window pane near a first end of the first edge and engaging the first track, a second one of the plurality of cams is pivotably secured to the sliding window pane near a first end of the second edge and engaging the second track, a third one of the plurality of cams is pivotably secured to the sliding window pane near a second end of the first edge and engaging the first track, and a fourth one of the plurality of cams is pivotably secured to the sliding window pane near a second end of the second edge and engaging the second track;

wherein the first and third cams are located within a groove formed in the first track and the second and the fourth cams are located within a groove formed in the second track;

an actuator operatively connected to the plurality of cams for selectively pivoting the cams; and wherein pivoting the plurality of cams within the grooves forcibly moves the sliding window pane relative to the first and second tracks between a closed position wherein an outside surface of the sliding window pane is in a first plane substantially flush with the panels so that the sliding window pane closes the opening and an open position wherein the outside surface of the sliding window pane is in a second plane substantially parallel to and offset from the first plane so that the sliding window pane can selectively move along the tracks as the cams slide along the grooves;

slots formed in the bottoms of the grooves;

a plurality of pins secured to the plurality of cams and extending into the slots so that the pins move along the slots as the sliding window pane moves along the tracks;

a link member connecting the pin secured to the second one of the plurality of cams and the pin secured to the fourth one of the plurality of cams to synchronize movement of the cams within the grooves;

wherein the pin secured to the second one of the plurality of cams and the pin secured to the fourth one of the plurality of cams extend entirely through the slot formed in the groove of the second track and connect the second and fourth ones of the cams disposed at a first side of the slot formed in the groove of the second track to the link member disposed at a second side of the slot formed in the groove of the second track opposite the first side of the slot formed in the groove of the second track; and wherein the second and fourth ones of the cams engage the first side of the slot formed in the groove of the second track and the pin secured to the second one of the plurality of cams and the pin secured to the fourth one of the plurality of cams engage the second side of the slot formed in the groove of the second track.

2. The sliding window assembly according to claim 1, wherein the plurality of pins are rigidly secured to the plurality of cams for movement therewith upon pivoting movement of the plurality of cams.

3. The sliding window assembly according to claim 1, wherein the slots have arcuate portions for accommodating movement of the plurality of pins upon pivoting movement of the plurality of cams.

4. The sliding window assembly according to claim 1, wherein a first connecting member is pivotably connected to the sliding window pane and extends between the first and second cams and is rigidly connected to the first and second cams for simultaneously pivoting the first and second cams upon selective pivoting of the first connecting member.

5. The sliding window assembly according to claim 4, wherein a second connecting member is pivotably connected to the sliding window pane and extends between the third and fourth cams and is rigidly connected to the third and fourth cams for simultaneously pivoting the third and fourth cams upon selective pivoting of the second connecting member.

6. The sliding window assembly according to claim 5, wherein the link member operably connects the first connecting member and the second connecting member to transfer pivoting motion thereof therebetween.

7. The sliding window assembly according to claim 5, wherein the actuator is secured to the first connecting member for selectively rotating the plurality of cams.

8. The sliding window assembly according to claim 1, wherein the actuator includes a handle for manually pivoting the plurality of cams.

9. A window assembly of a motor vehicle comprising, in combination:

a pair of spaced-apart fixed window panes forming an opening therebetween;

vertically spaced-apart upper and lower tracks;

a sliding window pane having opposed upper and lower edges configured to move along the upper and lower tracks;

a camming mechanism including a plurality of cams;

wherein a first one of the plurality of cams is pivotably secured to the sliding window pane near a first end of the upper edge and engaging the upper track, a second one of the plurality of cams is pivotably secured to the sliding window pane near a first end of the lower edge and engaging the lower track, a third one of the plurality of cams is pivotably secured to the sliding window pane near a second end of the upper edge and engaging the upper track, and a fourth one of the plurality of cams is pivotably secured to the sliding window pane near a second end of the lower edge and engaging the lower track;

wherein the first and third cams are located within a groove formed in the upper track and the second and fourth cams are located within a groove formed in the lower track;

an actuator operatively connected to the plurality of cams for selectively pivoting the plurality of cams; and wherein pivoting the plurality of cams within the grooves forcibly moves the sliding window pane relative to the upper and lower tracks between a closed position wherein an outside surface of the sliding window pane is in a first plane substantially flush with outer surface of the fixed window panes so that the sliding window pane closes the opening and an open position wherein the outside surface of the sliding window pane is in a second plane substantially parallel to and offset from the first plane so that the sliding window pane can selectively move along the tracks as the cams slide along the grooves;

slots formed in the bottoms of the grooves;

a plurality of pins secured to the plurality of cams and extending into the slots so that the pins move along the slots as the sliding window pane moves along the tracks;

a link member connecting the pin secured to the second one of the plurality of cams and the pin secured to the fourth one of the plurality of cams to synchronize movement of the cams within the grooves;

wherein the pin secured to the second one of the plurality of cams and the pin secured to the fourth one of the plurality of cams extend entirely through the slot formed in the groove of the lower track and connect the second and fourth ones of the cams at a first side of the slot formed in the groove of the lower track to the link member disposed at a second side of the slot formed in the groove of the lower track opposite the first side of the slot formed in the groove of the lower track; and wherein the second and fourth ones of the cams engage the first side of the slot formed in the groove of the lower track and the pin secured to the second one of plurality of the cams and the pin secured to the fourth one of the plurality of cams engage the second side of the slot formed in the groove of the lower track.

10. The window assembly according to claim 9, wherein the plurality of pins are rigidly secured to the plurality of cams for movement therewith upon pivoting movement of the plurality of cams.

11. The window assembly according to claim 9, wherein the slots have arcuate portions for accommodating movement of the plurality of pins upon pivoting movement of the plurality of cams.

12. The window assembly according to claim 9, wherein a first connecting member is pivotably connected to the sliding window pane and extends between the first and second cams and is rigidly connected to the first and second cams for simultaneously pivoting the first and second cams upon selective pivoting of the first connecting member.

13. The window assembly according to claim 12, wherein a second connecting member is pivotably connected to the sliding window pane and extends between the third and fourth cams and is rigidly connected to the third and fourth cams for simultaneously pivoting the third and fourth cams upon selective pivoting of the second connecting member.

14. The window assembly according to claim 13, wherein the link member operably connects the first connecting member and the second connecting member to transfer pivoting motion thereof therebetween.

15. The window assembly according to claim 9, wherein the actuator includes a handle for manually pivoting the plurality of cams.

* * * * *